(12) United States Patent
Uyeno et al.

(10) Patent No.: US 10,243,654 B1
(45) Date of Patent: Mar. 26, 2019

(54) ELECTRONICALLY STEERED INTER-SATELLITE OPTICAL COMMUNICATION SYSTEM AND METHODS

(71) Applicant: RAYTHEON COMPANY, Waltham, MA (US)

(72) Inventors: Gerald P. Uyeno, Tucson, AZ (US); Sean D. Keller, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 52 days.

(21) Appl. No.: 15/941,821

(22) Filed: Mar. 30, 2018

(51) Int. Cl.
  *H04B 10/118* (2013.01)
  *H04B 10/40* (2013.01)
(52) U.S. Cl.
  CPC ........... *H04B 10/118* (2013.01); *H04B 10/40* (2013.01)
(58) Field of Classification Search
  CPC ............................. H04B 10/118; H04B 10/40
  See application file for complete search history.

(56) References Cited

U.S. PATENT DOCUMENTS

| | | | |
|---|---|---|---|
| 6,271,953 | B1 | 8/2001 | Dishman et al. |
| 7,385,768 | B2 | 6/2008 | Wo et al. |
| 8,982,313 | B2 | 3/2015 | Escuti et al. |
| 9,413,461 | B2 | 8/2016 | Chao et al. |
| 9,477,135 | B1 | 10/2016 | Uyeno et al. |
| 2012/0081621 | A1 | 4/2012 | Dorschner et al. |
| 2014/0161466 | A1* | 6/2014 | Riza ............... H04B 10/1149 398/119 |
| 2015/0378242 | A1 | 12/2015 | Auxier et al. |

(Continued)

FOREIGN PATENT DOCUMENTS

| | | |
|---|---|---|
| WO | 0128137 A1 | 4/2001 |
| WO | 2014200581 A2 | 12/2014 |
| WO | 2017011649 A1 | 1/2017 |

OTHER PUBLICATIONS

Kim et al., "Wide-angle, nonmechanical beam steering using thin liquid crystal polarization gratings", retrieved on Mar. 31, 2017, URL: http://bnonlinear.com/pub/LCbeamSteer/Wide-angle_ nonmechanical_beam_steering_using_thin_LC_PGs.pdf.

(Continued)

*Primary Examiner* — Casey Kretzer
(74) *Attorney, Agent, or Firm* — Lando & Anastasi, LLP (57) ABSTRACT

Aspects are generally directed to an inter-satellite communication system and method of communicating between satellites. In one example, an inter-satellite communication system includes a first satellite transceiver having an entrance aperture, and a non-mechanical beamsteering device configured to steer a first beam of encoded optical data over a field of view thereof. The first satellite transceiver may include coarse steering optics configured to extend a field of regard of the non-mechanical beamsteering device. During a transmit mode, the coarse steering optics are positioned to transmit the first beam of encoded optical data through the entrance aperture in a direction of a second satellite transceiver. The first satellite transceiver may also include a beam splitter positioned, during a receive mode, to receive a second beam of encoded optical data from the second satellite transceiver and direct the second beam of encoded optical data to an optical sensor.

19 Claims, 4 Drawing Sheets

(56) References Cited

U.S. PATENT DOCUMENTS

2018/0227055 A1* 8/2018 Khatibzadeh .......... H04B 10/60

OTHER PUBLICATIONS

Buck et al., "Polarization Gratings for Non-mechanical Beam Steering Applications", retrieved on Mar. 31, 2017, URL: http://bnonlinear.com/pub/LCbeamSteer/Polarization_Gratings_for_Non-Mechanical_Beam_Steering_Applications.pdf.
Keller et al., "Emerging Liquid Crystal Waveguide Technology for Low SWaP Active Short Wave Infrared Imagers", Proceedings of SPIE (Jan. 2015), vol. 9384.
"SEEOR: Evanescently Coupled Non-mechanical Beam Steering", Vescent Photonics (2015), retrieved on Sep. 2, 2016, URL: http://www.vescent.com/wp-content/uploads/2015/04/LS-1uJ7.1.pdf.
"Optical Communications and Sensor Demonstration", NASA (2015), retrieved from the internet, URL: http://www.nasa.gov/sites/default/files/atoms/files/ocsd_fact_sheet_21oct2015.pdf.
Fishman, J., "NASA Small Satellites to Demonstrate Swarm Communications and Autonomy", NASA (2015), retrieved from the internet, URL: https://www.nasa.gov/feature/nasa-small-satellites-to-demonstrate-swarm-communications-and-autonomy.

* cited by examiner

FIG. 4

ELECTRONICALLY STEERED INTER-SATELLITE OPTICAL COMMUNICATION SYSTEM AND METHODS

BACKGROUND

Satellites have a variety of applications, such as earth observation, communication, weather monitoring, navigation, and surveillance, to name a few examples. The size, functionality, and orbit of a particular satellite are typically contingent on the specific purpose of that satellite. In many cases, a satellite may communicate with a ground station, and other satellites, to communicate information and ensure the proper operation of the satellite. For instance, a communication satellite may include a transponder that relays and amplifies a communication signal between a source and a destination. A variety of different communication satellites are integrated within television, telephone, internet, and radio network systems.

SUMMARY OF THE INVENTION

Various aspects and examples described herein provide inter-satellite communication systems and methods for communicating between satellites and/or a ground station. In various examples, an inter-satellite communication system includes one or more satellite transceivers that each include one or more non-mechanical optical steering components configured to provide a wide field of regard (FOR). In particular, a described satellite transceiver may include a non-mechanical beamsteering device to steer a beam of encoded optical data over a field of view thereof, and coarse steering optics to extend a field of regard of the non-mechanical beamsteering device. Moreover, the described satellite transceiver may transmit the beam of encoded optical data through an entrance aperture, and receive a response to the beam of encoded optical data (e.g., from a ground station or another satellite transceiver) via the same entrance aperture.

According to an aspect, provided is a method of communicating between satellites. In one example, the method comprises receiving ephemeris information at a first satellite transceiver, the ephemeris information specifying a first location of a second satellite transceiver, steering a first beam of encoded optical data over a field of view of a first non-mechanical beamsteering device of the first satellite transceiver, transmitting, for a duration of a transmit mode of the first satellite transceiver, the first beam of encoded optical data through a first entrance aperture in a direction of the first location of the second satellite transceiver and over an extended field of regard of the first non-mechanical beamsteering device, the field of regard being extended relative to the field of view of the first non-mechanical beamsteering device by first coarse steering optics, switching a mode of operation of the first satellite transceiver from the transmit mode to a receive mode at an expiration of the duration of the transmit mode, receiving a second beam of encoded optical data from the second satellite transceiver through the first entrance aperture during the receive mode, and directing the received second beam of encoded optical data along a receive path of the first satellite transceiver with a first beam splitter, and focusing the second beam of encoded optical data on a first optical sensor of the first satellite transceiver with an optical focusing element positioned along the receive path.

In various examples, the method further comprises receiving at least the first beam of encoded optical data at the second satellite transceiver, focusing the first beam of encoded optical data on a second optical sensor of the second satellite transceiver, and estimating a trajectory of the first satellite transceiver based at least in part on the first beam of encoded optical data. According to various examples, the method further comprises transmitting the second beam of encoded optical data from the second satellite transceiver to a projected location of the first satellite transceiver based at least in part on the estimated trajectory of the first satellite transceiver. In various examples, transmitting the second beam of encoded optical data from the second satellite transceiver includes steering the second beam of encoded optical data over a field of view of a second non-mechanical beamsteering device, and transmitting the second beam of encoded optical data to the projected location of the first satellite transceiver over an extended field of regard of the second non-mechanical beamsteering device, the field of regard being extended relative to the field of view of the second non-mechanical beamsteering device by second coarse steering optics.

According to various examples, the method further comprises providing the first beam of encoded optical data along a transmit path of the first satellite transceiver to the first beam splitter, and directing the first beam of encoded optical data to the first coarse steering optics with the first beam splitter, where the receive path is distinct from the transmit path. In various examples, the method further comprises generating the first beam of encoded optical data, the first beam of encoded optical data has a linear polarization, and converting the linear polarization to at least one of a left-handed circular-polarization and a right-handed circular polarization prior to transmitting the first beam of encoded optical data. In some particular examples, transmitting the first beam of encoded optical data over the extended field of regard of the first non-mechanical beamsteering device includes deflecting the first beam of encoded optical data at an angle based on a handedness of the circular-polarization.

According to various examples, the method further comprises locating a second location of the second satellite transceiver prior to receiving the second beam of encoded optical data from the second satellite transceiver, the second location of the second satellite transceiver being different from the first location of the second satellite transceiver. In various examples, receiving the ephemeris information at the first satellite transceiver includes receiving the ephemeris information from a satellite ground station. In some examples, the method further comprises locating the satellite ground station prior to receiving the ephemeris information from the satellite ground station. According to various examples, the method further comprises estimating a trajectory of the second satellite transceiver based at least in part on the second beam of encoded optical data, and transmitting a third beam of encoded optical data from the first satellite transceiver to a projected location of the second satellite transceiver based at least in part on the estimated trajectory of the second satellite transceiver.

According to an aspect, provided is an inter-satellite communication system. In one example, the inter-satellite communication system comprises a first satellite transceiver having a first entrance aperture. The first satellite transceiver includes a first non-mechanical beamsteering device configured to steer a first beam of encoded optical data over a field of view thereof, and first coarse steering optics configured to extend a field of regard of the first non-mechanical beamsteering device relative to the field of view of the first non-mechanical beamsteering device. During a transmit mode of the first satellite transceiver, the first coarse steering optics are positioned to transmit the first beam of encoded optical data through the first entrance aperture in a direction of a location of a second satellite transceiver, where the location of the second satellite transceiver is based on ephemeris information received at the first satellite transceiver. The inter-satellite communication system further comprises a first beam splitter positioned, during a receive mode of operation of the first satellite transceiver, to receive a second beam of encoded optical data from the second satellite transceiver through the first entrance aperture and direct the second beam of encoded optical data along a receive path, a first optical sensor positioned along the receive path to collect the second beam of encoded optical data, and an optical focusing element positioned in the receive path and configured to focus the second beam of encoded optical data onto the first optical sensor.

In various examples, the inter-satellite communication system further comprises an optical source configured to generate the first beam of encoded optical data, and the first beam of encoded optical data has a linear polarization. In various examples, the first satellite transceiver further includes first control circuitry operatively coupled to at least the optical source, the first non-mechanical beamsteering device, and the first coarse steering optics, the first control circuitry being configured to control the optical source, the first non-mechanical beamsteering device, and the first coarse steering optics to switch between the transmit mode and the receive mode of the first satellite transceiver. According to some examples, the inter-satellite communication system further comprises a quarter wave-plate interposed between the first non-mechanical beamsteering device and the first beam splitter, the quarter wave-plate configured to convert the linear-polarization to a circular-polarization. In some particular examples, the first coarse steering optics are configured to deflect the first beam of encoded optical data at an angle based on a handedness of the circular-polarization.

In various examples, the inter-satellite communication system further comprises the second satellite transceiver. The second satellite transceiver may include a second beam splitter configured to receive the first beam of encoded optical data through a second entrance aperture of the second satellite transceiver, and direct the first beam of encoded optical data along a receive path of the second satellite transceiver, a second optical sensor positioned along the receive path to collect the first beam of encoded optical data, a second optical focusing element positioned in the receive path to focus the first beam of encoded optical data onto the second optical sensor, and second control circuitry operatively coupled to at least the second optical sensor and configured to estimate a trajectory of the first satellite transceiver based at least in part on the first beam of encoded optical data.

According to various examples, the second satellite transceiver further includes a second non-mechanical beamsteering device configured to steer the second beam of encoded optical data over a field of view thereof, and second coarse steering optics configured to extend a field of regard of the second non-mechanical beamsteering device relative to the field of view of the second non-mechanical beamsteering device, and transmit the second beam of encoded optical data through the second entrance aperture to a projected location of the first satellite transceiver based at least in part on the estimated trajectory of the first satellite transceiver.

In various examples, the first satellite transceiver further comprises first control circuitry operatively coupled to at least the first optical sensor and configured to estimate a trajectory of the second satellite transceiver based at least in part on the second beam of encoded optical data. In various examples, first coarse steering optics are configured to transmit a third beam of encoded optical data through the first entrance aperture to a projected location of the second satellite transceiver based at least in part on the estimated trajectory of the second satellite transceiver.

Still other aspects, embodiments, and advantages of these exemplary aspects and examples are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and examples described herein may also include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Various aspects and examples described herein provide inter-satellite communication systems and methods for communicating between satellites and/or a ground station. In various examples, an inter-satellite communication system includes at least one satellite transceiver. The satellite transceiver includes a non-mechanical beamsteering device that is configured to provide fine angle beamsteering over a field of view thereof, and coarse steering optics configured to provide coarse beamsteering to extend a field of regard of the non-mechanical beamsteering device. The described satellite transceiver may transmit a steered beam of encoded optical data through an entrance aperture, and receive a response to that beam of encoded optical data via the same entrance aperture.

As discussed, many satellites rely on inter-satellite communications and/or communications with a ground station to properly function. To transmit information to a ground station or another satellite, typical satellites utilize mechanical beamsteering optics to direct free space communications. For instance, some satellites include gimbal-based systems that permit the physical displacement (e.g., rotation) of the system to enable selective aiming. However, these mechanical beamsteering optics are, in general, limited by their mechanical properties. Limitations may include, but are not limited to, complexity, size, weight, and cost. Moreover, mechanical beamsteering optics may be negatively influenced by vibrations and inertia that is introduced by movement of those optics.

Accordingly, various aspects and examples described herein provide inter-satellite communication systems that provide continuous fine angle beamsteering and discrete coarse angle beamsteering for a wide field of regard, while also maintaining a reduced weight, size, and power consumption when compared to typical satellite communication systems. In many examples, the inter-satellite communication systems described herein include one or more satellite transceivers that are incorporated within a microsatellite that has a 2000 km communication range, at least a 1 Mb/s data rate, and a field of regard of plus or minus (+/−) 70 degrees from an optical boresight over 360 degrees in azimuth. Various other advantages and benefits of the inter-satellite communication systems and methods for communicating between satellites and/or a ground station are discussed below with reference to drawings.

It is to be appreciated that embodiments of the systems and methods discussed herein are not limited in application to the details of construction and the arrangement of components set forth in the following description or illustrated in the accompanying drawings. The systems and methods are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
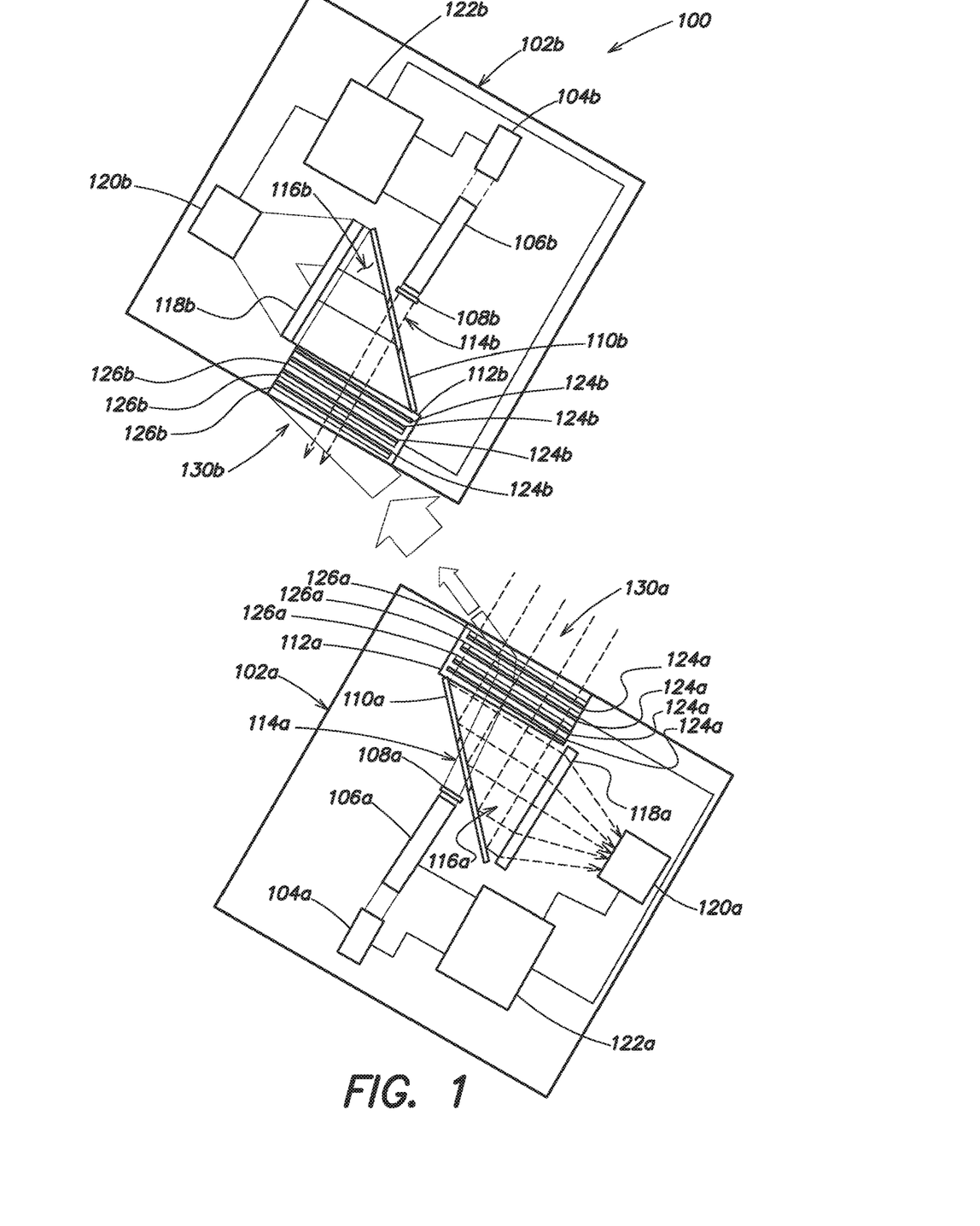
FIG. 1 is an example of an inter-satellite communication system according to various examples described herein.

FIG. 1 illustrates an inter-satellite communication system 100 according to various examples described herein. As illustrated in FIG. 1, the inter-satellite communication system 100 may include at least a first satellite transceiver 102a, and in some instances, may include additional satellite transceivers (e.g., the illustrated second satellite transceiver 102b). Each satellite transceiver 102a, 102b may be incorporated within a respective satellite housing, such as a housing of a microsatellite. While illustrated in FIG. 1 as including the first satellite transceiver 102a and the second satellite transceiver 102b, in other examples, the inter-satellite communication system 100 may include more than two satellite transceivers. That is, the inter-satellite communication system 100 may include a network of many interconnected satellite transceivers. Each of the satellite transceivers within such a network may communicate (e.g., send and receive information) as described below with reference to the first and second satellite transceivers 102a, 102b. In further examples, each of the satellite transceivers, for instance the first and second satellite transceivers 102a 102b, may communicate with a ground station (not shown in FIG. 1). These examples are further described below with reference to at least FIG. 2.

Figure 2:
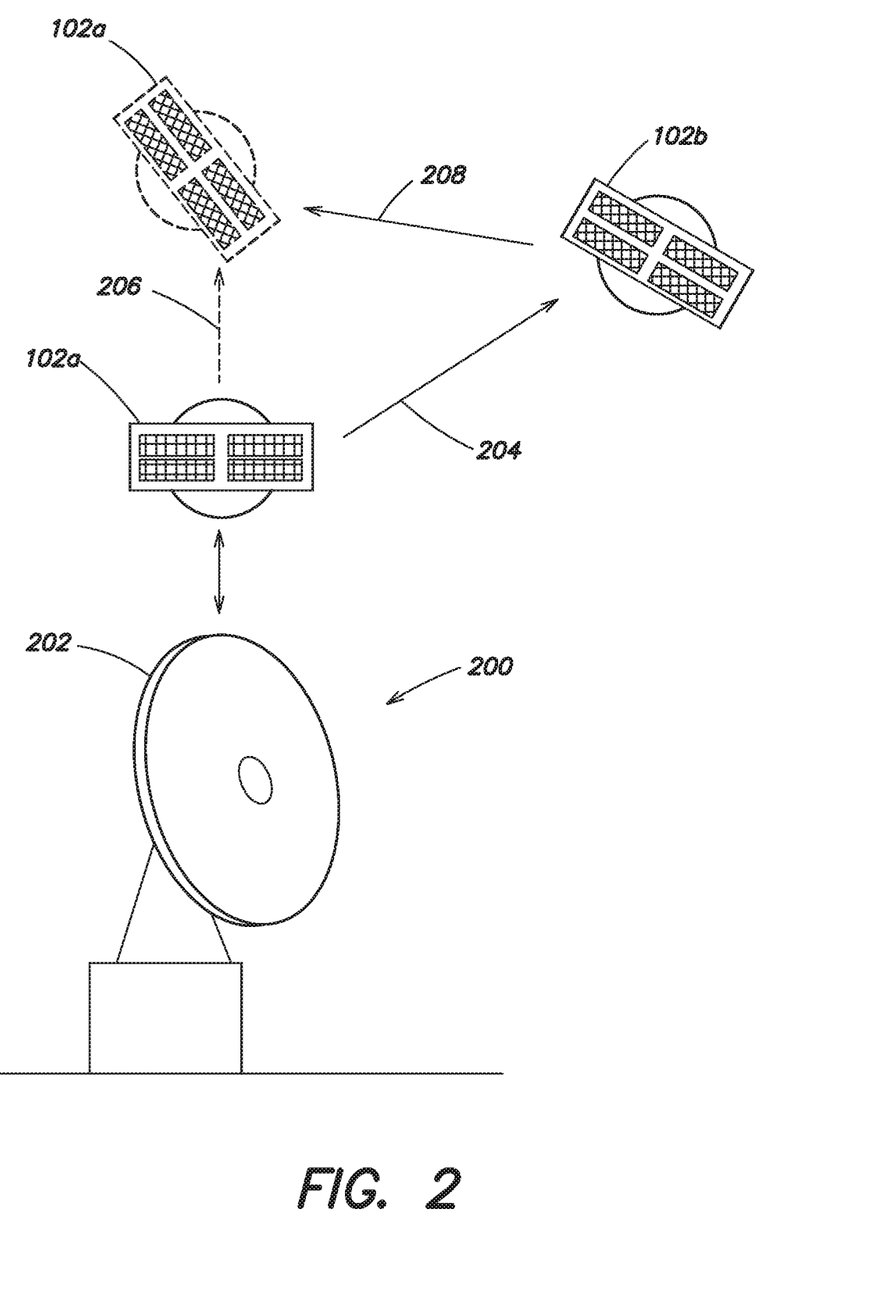
FIG. 2 is an illustration of free space communication between a first satellite transceiver, a second satellite transceiver, and a satellite ground station of the inter-satellite communication system illustrated in FIG. 1, according to various examples described herein.

While satellites as described herein with reference to at least FIG. 1 and FIG. 2 may include artificial objects placed in orbit, such as low earth orbiting microsatellites, in other examples the satellites may be replaced with other space-based platforms or other mobile platforms (e.g., aircrafts or vehicles). Similarly, while the ground stations described herein may refer to an immobile satellite ground station for an artificial object in space, in other examples, the ground station may be mobile and/or may refer to other communication platforms located on the Earth's surface or in the Earth's atmosphere.

As illustrated in FIG. 1, the first satellite transceiver 102a may include one or more non-mechanical optical elements (i.e., non-mechanical beamsteering components) that are positioned to steer and transmit a beam of encoded optical data, and receive a response. In many instances, the response may also be a beam of encoded optical data. For instance, the response may be a free-space optical communication that is transmitted by another satellite transceiver or a satellite ground station. As discussed herein, beams of encoded optical data may include non-ionizing electromagnetic radiation encoded with information, such as location information, satellite health information, and/or timing information, among other data. In some particular examples, the encoded optical data includes ephemeris data for one or more of the satellite transceivers in the inter-satellite communication system 100. Ephemeris data is a set of data that describes the location of a celestial body over regular intervals. Encoded optical data may be transmitted or received by the one or more satellite transceivers at a data rate of about 1 Mb/s (e.g., +/−.1 Mb/s) or at a data rate between 1 Mb/s and 10 Mb/s. In particular examples, the beams of encoded optical data are within one or more of the visible and near-infrared (VNIR) spectral band, the short-wavelength infrared (SWIR) spectral band, the mid-wavelength infrared (MWIR) spectral band, the long-wavelength infrared (LWIR) spectral band, the very long wavelength infrared (VLWIR) spectral band, and the far infrared (FIR) spectral band. However, in other examples, the beam of encoded optical data may be a microwave signal or a radio-frequency signal.

The first satellite transceiver 102a includes an entrance aperture 130a, an optical source 104a, a non-mechanical beamsteering device 106a, coarse steering optics 112a, a beam splitter 110a, and an optical sensor 120a. The first satellite transceiver 102a may also include an optical focusing element 118a, a quarter wave-plate 108a, and control circuitry 122a (e.g., a controller), among other components. The second satellite transceiver 102b may include the same components (or similar components) as the first satellite transceiver 102a. That is, the second satellite transceiver 102b may also include an entrance aperture 130b, an optical source 104b, a non-mechanical beamsteering device 106b, coarse steering optics 112b, a beam splitter 110b, an optical sensor 120b, an optical focusing element 118b, a quarter wave-plate 108b, and control circuitry 122b (e.g., a controller), among other components.

In various examples, individual satellite transceivers within the inter-satellite communication system 100 have a single aperture. That is, the first satellite transceiver 102a may send and receive signals via a single aperture, and the second satellite transceiver 102b may send and receive signals via a single aperture. In addition to reducing the complexity of the satellite transceivers 102a, 102b when compared to satellites having more than one window, the symmetric bidirectional single aperture arrangements described herein reduce the size, weight, power consumption, and cost of the described satellite transceivers 102a, 102b. In some examples, the entrance apertures 130a, 130b may each be a window within a housing of the respective satellite transceiver 102a, 102b. However, as illustrated in FIG. 1, in other examples, the entrance apertures 130a, 130b may be defined by the perimeter of an optical component of the respective satellite transceiver 102a, 102b, such as the illustrated coarse steering optics 112a, 112b. In various examples, the boresight of each satellite transceiver 102a, 102b is positioned orthogonal to a satellite axis of the corresponding satellite when an angle from nadir is zero degrees.

Each of the satellite transceivers 102a, 102b may have one or more modes of operation. For instance, each of the satellite transceivers 102a, 102b may have a transmit mode of operation and receive mode of operation. During the transmit mode of operation, components of the respective satellite transceiver 102a, 102b are controlled to propagate a beam of encoded optical data along a corresponding transmit path 114a, 114b and through the corresponding entrance aperture 130a, 130b. In particular, during the transmit mode, a beam of encoded optical data may be controllably steered be the respective satellite transceiver 102a, 102b in a direction of an intended recipient. In contrast, during the receive mode of operation, components of the respective satellite transceiver 102a, 102b are controlled to receive a beam of encoded optical data along a corresponding receive path 116a, 116b and through the corresponding entrance aperture 130a, 130b. For instance, a received beam of encoded optical data may be received from another satellite transceiver within the inter-satellite communication system 100, or a satellite ground station. Various processes for controlling the mode of operation of a satellite transceiver 102a, 102b, and switching between modes of operation, are further described below with reference to at least the control circuitry 122a, 122b of each satellite transceiver 102a, 102b. For purposes of illustration, FIG. 1 shows the first satellite transceiver 102a in the transmit mode of operation, and the second satellite transceiver 102b in the receive mode of operation.

While shown and described as operating in one of a transmit mode of operation or a receive mode of operation, in other examples, the satellite transceivers 102a, 102b may alternatively operate in a transceiver mode of operation. During the transceiver mode of operation, the corresponding satellite transceiver 102a, 102b both transmits a beam of encoded optical data and receives a beam of encoded optical data. That is, as a result of the separated transmit path 114a, 114b and the receive path 116a, 116b, in some examples, the satellite transceiver 102a, 102b may send and receive data simultaneously. During the transceiver mode, the satellite transceiver 102a, 102b may perform operations consistent with both the transmit mode and the receive mode of operation.

As illustrated in FIG. 1, during the transmit mode of operation, the optical source 104a of the first satellite transceiver 102a is configured to generate a beam of encoded optical data. The optical source 104a may include a laser source configured to produce a spot beam having a linear polarization. While in one example, the laser source may be a Nd:YAG laser, in certain other examples, other laser sources may be used. For instance, the optical source 104a may include a laser source that is configured to emit non-ionizing electromagnetic radiation, such as visible and near-infrared (VNIR) light, short-wavelength infrared (SWIR) radiation, mid-wavelength infrared (MWIR) radiation, long-wavelength infrared (LWIR) radiation, very long wavelength infrared (VLWIR) radiation, or far infrared (FIR) radiation. In other examples, the beam of encoded optical data may be a microwave signal or a radio-frequency signal. In one particular example, the optical source 104a emits an optical beam at a wavelength of 1.55 microns.

The optical source 104a is positioned to direct the beam of encoded optical data along the transmit path 114a and in a direction of the non-mechanical beamsteering device 106a. As illustrated in FIG. 1, the transmit path 114a of the first satellite transceiver 102a may be distinct (e.g., separated) from the receive path 116a of the first satellite transceiver 102a. The transmit path 114a and the receive path 116a may converge at the beam splitter 110a.

The non-mechanical beamsteering device 106a is positioned along the transmit path 114a to receive the beam of encoded optical data from the optical source 104a and steer the beam of encoded optical data over a field of view thereof. In various examples, the non-mechanical beamsteering device 106a is a solid-state waveguide, such as a solid-state liquid crystal waveguide (also referred to as a "liquid crystal waveguide"), that propagates the received beam of encoded optical data along a length thereof. The liquid crystal waveguide may receive the transmitted beam via a fiber coupling from the optical source 104a, and continuously scan the beam of encoded optical data over a two-dimensional fine angular range, e.g., horizontally in plane and vertically out of plane with the liquid crystal waveguide. In various examples, the liquid crystal waveguide is configured for fine angle steering, whereas, the coarse steering optics 112a are configured for coarse angle steering.

For instance, the liquid crystal waveguide may be controlled to steer the beam of encoded optical data over an angular range of +/−8.8 degrees in plane with the liquid crystal waveguide and over an angular range of +/−4.4 degrees out of plane with the liquid crystal waveguide. However, in other examples, other angular ranges may be used, and in particular, the two-dimensional fine angular range of the non-mechanical beamsteering device may be limited by the angle of acceptance of the subsequent optical component positioned along the transmit path 114a (e.g., the quarter wave-plate 108a shown in FIG. 1). In various examples, the liquid crystal waveguide may steer the beam of encoded optical data at a rate of up to 1 degree per microsecond.

In one example, the non-mechanical beamsteering device 106a (e.g., liquid crystal waveguide) may be coupled and in electrical communication with the control circuitry 122a. The control circuitry 122a may apply a control voltage (e.g., an analog control voltage) to the liquid crystal waveguide to adjust a refractive index of the liquid crystal waveguide. Adjustments the refractive index of the liquid crystal waveguide adjust the direction of the beam of encoded optical data as it propagates along the length of the liquid crystal waveguide, thereby, steering the encoded beam of optical data in a desired direction. In particular, the control circuitry 122*a* may apply a time-varying control voltage to the liquid crystal waveguide to steer the beam of encoded optical data to a desired position within the field of view of the liquid crystal waveguide.

The quarter wave-plate 108*a* is positioned along the transmit path 114*a* to receive the beam of encoded optical data from the non-mechanical beamsteering device 106*a*. As discussed, in some examples, the beam of encoded optical data has a linear polarization. The quarter wave-plate 108*a* is configured to convert the linear-polarization into a circular polarization. As further discussed below, control of the particular handedness (e.g., left-handed polarization or right-handed polarization) of the beam of encoded optical data may be used to control the angle of deflection of the beam at an output of the coarse steering optics 112*a*.

As illustrated in FIG. 1, the beam of encoded optical data propagates from the quarter wave-plate 108*a* along the transmit path 114*a*, through the beam splitter 110*a*, and is received at the coarse steering optics 112*a*. In the illustrated example, the beam splitter 110*a* is a beamsteering mirror. The beamsteering mirror has a reflective surface positioned in a direction facing the coarse steering optics 112*a*. A center aperture is positioned at about a center of the reflective surface. As shown, the beam of encoded optical data is directed from the quarter wave-plate 108*a* through the center aperture of the beamsteering mirror and received at the coarse steering optics 112*a*. In various examples, the transmit path 114*a* and the receive path 116*a* of the first satellite transceiver 102*a* converge at the beam splitter 110*a*. That is, after passing through the center aperture in the beamsteering mirror, the beam of encoded optical data propagates along a shared optical path with optical information received by the first satellite transceiver 102*a* via the entrance aperture 130*a* (further discussed below).

The coarse steering optics 112*a* are positioned to receive the beam of encoded optical data from the quarter wave-plate 108*a*, and configured to extend a field of regard of the non-mechanical beamsteering device 106*a* relative to the field of view thereof. During the transmit mode of the first satellite transceiver 102*a*, the coarse steering optics 112*a* are positioned to transmit the beam of encoded optical data through the entrance aperture 130*a* in a direction of an intended recipient (e.g., to a current location or a projected location of the second satellite transceiver 102*b* or a ground station). In various examples, the coarse steering optics 112*a* are configured to provide discrete coarse steering over a second angular range that is broader than the fine angular range of the non-mechanical beamsteering device 106*a*. Similar to the non-mechanical beamsteering device 106*a*, which may be a liquid crystal waveguide, the coarse steering optics 112*a* may also be non-mechanical.

In various examples, the coarse steering optics 112*a* is a polarized grating stack. Each polarized grating within the stack is a non-mechanical electrically-controllable half-wave plate and grating. For example, each polarized grating may be a liquid crystal polarization grating (e.g., wave plate with a spatially varying axis of birefringence). The number of polarized gratings within the stack may be selected based on the desired range of angular deflection (angular steering) provided by the coarse steering optics 112*a*. Accordingly, the number of polarized gratings may depend on the intended use of the corresponding satellite transceiver.

In the illustrated example, the coarse steering optics 112*a* includes three polarized gratings 126*a* that provide coarse beamsteering in a first plane. For instance, the three polarized gratings 126*a* may provide beamsteering over +/−8.8 degrees, +/−17 degrees, and +/−35 degrees in plane with the non-mechanical beamsteering device 106*a*, respectively. The coarse steering optics 112*a* also includes four polarized gratings 124*a* that provide coarse beamsteering in a second plane. For instance, the four polarized gratings 124*a* may provide beamsteering over +/−4.4 degrees, +/−8.8 degrees, +/−17 degrees, and +/−35 degrees out of plane with the non-mechanical beamsteering device 106*a*, respectively. In particular, the coarse steering optics 112*a* may include an additional polarized grating (e.g., corresponding to +/−4.4 degrees) to compensate for the limited angular range of the non-mechanical beamsteering 106*a* in the out of plane direction.

As illustrated, the coarse steering optics 112*a* (e.g., polarized grating stack) may be coupled and in electrical communication with the control circuitry 122*a*. In particular, each individual polarized grating may be coupled to the control circuitry 122*a*. Application of a control voltage (e.g., an analog control voltage) to individual polarized gratings within the stack electrically controls those polarized gratings to convert the received circularly polarized beam of encoded optical data into either a left-handed polarization or a right-handed polarization. The polarized grating stack is configured to deflect beam of encoded optical data at a particular angle of deflection based on the polarization of the beam. Accordingly, by controlling the handedness of the beam of encoded optical data, the angle of deflection provided by the coarse steering optics 112*a* may be controlled.

Whereas the non-mechanical beamsteering device 106*a* (e.g., liquid crystal waveguide) provides continuous beamsteering, in various examples the coarse steering optics 112*a* provides discrete beamsteering. Accordingly, to steer at different angles of deflection, different individual polarized gratings within the polarized grating stack may be engaged (e.g., provided a control voltage). Different angles of deflection may be provided by engaging different combinations of polarized gratings within the stack. Continuing with the angles of deflection described above, and the described fine angular range of the non-mechanical beamsteering device 106*a*, the beam of encoded optical data may be steered over a field of regard of up to about +/−70 degrees (e.g., +/−.5 degrees) from the optical boresight of the first satellite transceiver 102*a* and over 360 degrees in azimuth. The beam may also be steered continuously between about +/−70 to 53 degrees (e.g., +/−.5 degrees) from the optical boresight by adjusting the control voltage applied to the non-mechanical beamsteering device 106*a*.

In various examples, the beamsteering collectively provided by the non-mechanical beamsteering device 106*a* and the coarse steering optics 112*a* eliminates the mechanical disturbances that would normally impact the operation of a satellite transceiver. In particular, the non-mechanical beamsteering device 106*a* and the coarse steering optics 112*a* eliminate moving parts that would otherwise introduce vibration and inertia disturbances in transmitted information. Moreover, the non-mechanical beamsteering device 106*a* and the coarse steering optics 112*a* provide high-speed beam steering functionality (e.g., up to 1 degree/microsecond) that increases an operating margin for establishing bidirectional communication links between multiple satellite transceivers and/or a ground station. Such aspects further permit active jitter compensation, which ensures a more reliable communication link.

As previously discussed, and as shown in FIG. 1, the second satellite transceiver 102*b* may include the same components as the first satellite transceiver 102*a*. That is, the optical source 104*b*, non-mechanical beamsteering device 106*b*, quarter wave-plate 108*b*, beam splitter 110*b*, coarse steering optics 112*b*, optical focusing element 118*b*, optical sensor 120*b*, and control circuitry 122*b* of the second satellite transceiver 102*b* may have the same structure and function as the optical source 104*a*, non-mechanical beam-steering device 106*a*, quarter wave-plate 108*a*, beam splitter 110*a*, coarse steering optics 112*a*, optical focusing element 118*a*, optical sensor 120*a*, and control circuitry 122*a* of the first satellite transceiver 102*a*. Accordingly, the second satellite transceiver 102*b* may generate, steer, and transmit a beam of encoded optical data in a manner similar to the first satellite transceiver 102*a*. That is, the components of the second satellite transceiver 102*b* may be controlled in a manner similar to the components of the first satellite transceiver 102*a* to transmit a beam of encoded optical data. Additional satellite transceivers included within the inter-satellite communication system 100 (e.g., a third satellite transceiver, a fourth satellite transceiver, etc.) may also include similar components, and may operate in a similar manner to transmit information.

As further shown in FIG. 1, components of the second satellite transceiver 102*b* may be positioned to receive a beam of encoded optical data, such as the beam of encoded optical data transmitted by the first satellite transceiver 102*a*. In FIG. 1, the first satellite transceiver 102*a* is illustrated as transmitting the beam of encoded optical data at 70 degrees off boresight, and the second satellite transceiver 102*b* is illustrated as receiving the beam of encoded optical data at 70 degrees off boresight. However, each of these angles may vary during the operation of the inter-satellite communication system 100 (e.g., based on the relative positions of the satellite transceivers 102*a*, 102*b*). Since the first satellite transceiver 102*a* includes the same components (or similar components) as the second satellite transceiver 102*b*, the first satellite transceiver 102*a* may receive a beam of encoded optical data in a manner similar to that described below with reference to the second satellite transceiver 102*b*. Such operations are not re-described with reference to the first satellite transceiver 102*a*.

During the receive mode of operation, the second satellite transceiver 102*b* receives the beam of encoded optical data from the first satellite transceiver 102*a* via free-space communication at the entrance aperture 130*b* of the second satellite transceiver 102*b*. As also discussed above with reference to the first satellite transceiver 102*a*, the second satellite transceiver 102*b* includes an entrance aperture 130*b* that is positioned along a shared optical path of the second satellite transceiver 102*b*. As illustrated, the shared optical path is an optical path common to a transmit path 114*b* and a receive path 116*b* of the second satellite transceiver 102*b*. Accordingly, the entrance aperture 130*b* is positioned to both transmit and receive optical information along a bidirectional optical path.

The received beam of encoded optical data is directed from the entrance aperture 130*b* to the beam splitter 110*b*, which in one example is a beamsteering mirror. A reflective surface of the beamsteering mirror reflects the received beam of encoded optical data in a direction of the focusing optical element 118*b* along the receive path 116*b* of the second satellite transceiver 102*b*. While FIG. 1 illustrates a beamsplitting mirror that is positioned to reflect received optical information from a reflective surface thereof, and pass (e.g., through a center aperture) transmitted optical data, in various other examples, of the arrangement of the reflective surface and center aperture may be reversed. That is, the beamsplitting mirror may be positioned to reflect the transmitted optical information, and pass the received optical information. As shown, the beam splitter 110*b* directs the received beam of encoded optical data to the optical focusing element 118*b*.

The received beam of encoded optical data is received at the optical focusing element 118*b* from the beam splitter 110*b*. In various examples, the optical focusing element 118*b* is a focusing mirror or focusing lens that is positioned to direct the received beam of encoded optical data to the optical sensor 120*b*. In some examples, the optical focusing element 118*b* is further configured to focus the received beam of encoded optical data at the optical sensor 120*b*. For instance, the optical focusing element 118*b* may focus the received beam of encoded optical data within a field of view of the optical sensor 120*b*. The optical sensor 120*b* is positioned to receive and collect the received beam of encoded optical data.

In various examples, the optical sensor 120*b* is sensitive to optical radiation within a spectrum corresponding to the wavelength of the received beam of encoded optical data. Accordingly, in various examples, the optical sensor 120*b* is configured to detect optical data within one or more of the visible and near-infrared (VNIR) spectral band, the short-wavelength infrared (SWIR) spectral band, the mid-wavelength infrared (MWIR) spectral band, the long-wavelength infrared (LWIR) spectral band, the very long wavelength infrared (VLWIR) spectral band, and the far infrared (FIR) spectral band. However, in other examples, the optical sensor 120*b* may be configured to detect a microwave signal or a radio-frequency signal. Some examples of the optical sensors 120*a*, 120*b* may include pixel detectors, quad cell detectors, and imaging arrays, to name a few. Detector materials may include Si and InGaAs (e.g., for light within the VNIR spectral band), InSb (e.g., for light within the MWIR spectral band), and HgCdTe (e.g., for light within the LWIR spectral band). In some examples, it may also be possible to use HgCdTe for light within the MWIR spectral band and the short-wavelength infrared (SWIR) spectral band. In various examples, the optical sensor 120*b* is coupled to a Read-Out Integrated Circuit (ROIC) which may read-out information from the optical sensor 120*b* and communicate that information to the control circuitry 122*b*. In various examples, the ROIC may be configured to demodulate the received beam of encoded optical data.

The control circuitry 122*b* may include a single controller; however, in various other embodiments the control circuitry 122*b* may consist of a plurality of controllers. The control circuitry 122*b* may include a combination of software-configured elements, signal processing circuitry, application specific integrated circuitry, field-programmable gate arrays, other specialized hardware components, or any combination of various hardware and logic circuitry for performing the various operations and processes discussed herein. In one example, the control circuitry 122*b* includes a processor, data storage, and one or more interfaces (e.g., for system components). The processor may be coupled to the data storage, and the one or more interfaces, and may be configured to perform a series of instructions (e.g., routines) that result in manipulated data stored and retrieved from the data storage. In some examples, the stored and retrieved data may correspond to the data encoded on the received beam of encoded optical data (e.g., ephemeris data amongst other data).

The instructions stored on the data storage may include executable programs or other code that can be executed by the processor. The instructions may be persistently stored as encoded signals, and the instructions may cause the processor to perform the functions and processes described herein.

The data storage may include information that is recorded, on or in, the medium, and this information may be processed by the processor during execution of instructions. The data storage includes a computer readable and writeable non-volatile data storage medium configured to store non-transitory instructions and data. In addition, the data storage includes processor memory that stores data during operation of the processor.

However, in other examples, the control circuitry 122b is a specially-programmed, special-purpose hardware, such as for example, an application-specific integrated circuit (ASIC) configured (e.g., structured) to perform one or more operations disclosed herein, or a field programmable gate array (FPGA) configured (e.g., structured) to perform one or more operations disclosed herein. For instance, the control circuitry 122b may include an array of programmable logic blocks (including logical cells) that are specified to perform the various steps, acts, and functions described herein. For instance, the programmable logic blocks may be interconnected with various logic gates. The data storage (e.g., memory) may be incorporated within the ASIC or FPGA, or implemented separate from the ASIC or FPGA. For instance, the memory may be implemented as one or more RAM blocks within the control circuitry 122b. In certain other examples, the control circuitry 122b may include a non-volatile memory module and/or a combination of non-volatile memory components and volatile memory components. The ASIC or FPGA may be designed in a hardware description language (HDL), such as any language utilized for FPGA development or ASIC development.

In addition to the other operations discussed herein, the control circuitry 122b may control the state of operation of the second satellite transceiver 102b, control the application of one or more control voltages to the non-mechanical beamsteering device 106b (e.g. polarized gratings 124b, 126b), control the application of one or more control voltages to the coarse steering optics 112b, control the optical source 120b, estimate the trajectory of another satellite transceiver (e.g., the first satellite transceiver 102a), and/or estimate a position of a satellite ground station. The control circuitry 122a of the first satellite transceiver 102a may be implemented in the same manner, may include the same components, and may perform operations similar to the control circuitry 122b, each of which is not repeated here. The control circuitry 122a, 122b is shown as connected to the other components of the respective satellite transceiver 102a, 102b by discrete lines in FIG. 1. Each of the discrete lines may be an electrical connection (e.g., wired or wireless) that supports the communication of control signals, instructions, and/or data. The control circuitry 122a, 122b of the first and second satellite transceivers 102a, 102b is further described with reference to FIG. 2.

FIG. 2 illustrates optical communication (e.g., free space optical communication) between a ground station 200 (e.g., satellite ground station), the first satellite transceiver 102a, and the second satellite transceiver 102b. As discussed herein, the ground station 200 is a terrestrial satellite station designed for establishing a telecommunication link with one or more spacecrafts (e.g., satellites). While shown in FIG. 2 as being positioned at a fixed location on the Earth's surface, in other examples, the ground station 200 may change position and/or may be located within the Earth's atmosphere. While illustrated as having a satellite dish 202, the ground station 200 may include other types of antennas and waveguides.

In various examples, the first satellite transceiver 102a is configured to initiate communication with the second satellite transceiver 102b based on received ephemeris information that specifies a location of the second satellite transceiver 102b. For instance, the ephemeris information may be received from the ground station 200 or another satellite transceiver. Based on the received ephemeris information, the control circuitry 122a of the first satellite transceiver 102a may estimate a trajectory of the second satellite transceiver 102b. The control circuitry 122a may use various algorithms for calculating the position of a satellite in orbit to estimate the trajectory of the second satellite transceiver 102b. It is appreciated that in many instances, both the first satellite transceiver 102a and the second satellite transceiver 102b may be in motion during optical communication, and accordingly, the control circuitry 122a may account for the current position and projected path of travel of the first satellite transceiver 102a when estimating the trajectory of the second satellite transceiver 102b.

As discussed above, the first satellite transceiver 102a may transmit a beam of encoded optical data when in the transmit mode of operation. To switch the first satellite transceiver 102a to the transmit mode of operation, the control circuitry 122a may activate the optical source 104a, and de-activate (or ignore) the optical sensor 120a. Moreover, in the transmit mode, the control circuitry 122a may engage the non-mechanical beamsteering device 106a and the coarse steering optics 112a by providing one or more control voltages thereto. In particular, based on the estimated trajectory of the second satellite transceiver 102b, the control circuitry 122a may control the optical source 104a to generate a beam of encoded optical data, control the steering of the non-mechanical beamsteering device 106a (e.g., via one or more control voltages), and control the angle of deflection of the coarse steering optics 112a (e.g., via one or more control voltages), to transmit the encoded beam of optical data to a projected location of the second satellite transceiver 102b. The encoded beam of optical data is illustrated in FIG. 2 as arrow 204. Once the beam of encoded optical data is transmitted, the control circuitry 122a may switch the first satellite transceiver 102a to the receive mode of operation to "listen" for a response.

FIG. 2 shows the beam of encoded optical data being received by the second satellite transceiver 102b. In particular, the second satellite transceiver 102b receives the beam of encoded optical data when in the receive mode of operation. To switch the second satellite transceiver 102b to the receive mode of operation, the control circuitry 122b of the second satellite transceiver 102b may de-activate the optical source 104b and read-out information from the optical sensor 120b (e.g., read-out information corresponding to the data encoded on the received beam of encoded optical data). Based on the beam of encoded optical data received at the second satellite transceiver 102b, the control circuitry 122b of the second satellite transceiver 102b may estimate a trajectory of the first satellite transceiver 102a. The control circuitry 122b of the second satellite transceiver 102b may use various algorithms for calculating the position of a satellite in orbit to estimate the trajectory of the first satellite transceiver 102a. The control circuitry 122b of the second satellite transceiver 102b may then control the second satellite transceiver 102b to switch to a transmit mode of operation to transmit a response.

Based on the estimated trajectory of the first satellite transceiver 102a, the control circuitry 122b may control the optical source 104b to generate a beam of encoded optical data, control the steering of the non-mechanical beamsteering device 106b (e.g., via one or more control voltages), and control the angle of deflection of the coarse steering optics 112b (e.g., via one or more control voltages), to transmit a second encoded beam of optical data (e.g., a "response") to a projected location of the first satellite transceiver 102a. In particular, the second satellite transceiver 102b may perform operations similar to those discussed above with reference to the first satellite transceiver 102a to transmit and steer a beam of encoded optical data. In FIG. 2, the projected location of the first satellite transceiver 102a is shown in ghost lines. The estimated path of travel is illustrated by ghost arrow 206.

While in some examples, the second satellite transceiver 102b may respond to the first satellite transceiver 102a by transmitting a beam of encoded optical data back to the first satellite transceiver 102a (shown as arrow 208), it is appreciated that in other examples, the second satellite transceiver 102b may transmit the second beam of encoded optical data to another satellite transceiver (e.g., a third satellite transceiver) or a ground station instead. In other examples, the second satellite transceiver 102b may transmit more than one beam of encoded optical data. For instance, the second satellite transceiver 102b may first transmit a second beam of encoded optical data to the first satellite transceiver 102a, and subsequently transmit a third beam of encoded optical data to the ground station 200. The first satellite transceiver 102a may operate in a similar manner.

In some examples, prior to receiving a beam of encoded optical data, the satellite transceiver 102a, 103b may perform one or more operations to locate the source of that transmission. These operations may be performed in the receive mode, for example. For instance, the satellite transceiver 102a, 102b may position itself such that the corresponding entrance aperture 130a, 130b is within a line of sight of the transmission source. Accordingly, in various examples, the satellite transceiver 102a, 102b may control the corresponding coarse steering optics 112a, 112b, as previously discussed, to locate the transmission source (e.g., the other satellite(s) and/or satellite ground station).

Figure 3:
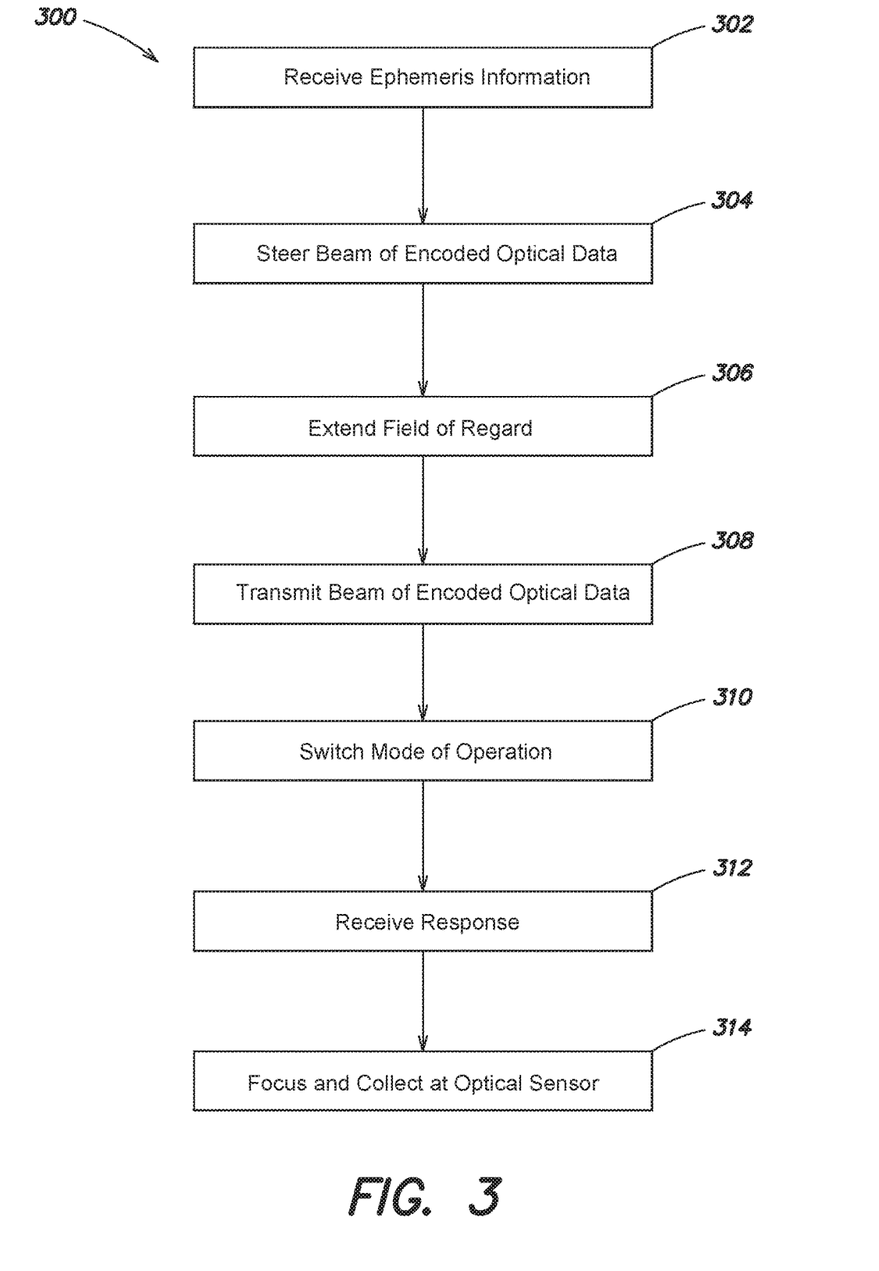
FIG. 3 is a process flow for communicating between satellites, according to various examples described herein.

As discussed above with reference to at least FIGS. 1-2, various examples perform processes to communicate between two or more satellite transceivers and/or a satellite ground station. These processes may be performed by an inter-satellite communication system, and in particular, one or more satellite transceivers within a satellite communication system. FIG. 3 illustrates one example of a process 300 for communicating between satellites. One or more acts of the process described with reference to FIG. 3 may be performed by the inter-satellite communication system 100 illustrated in FIG. 1. Accordingly, FIG. 3 is described with continuing reference to at least FIG. 1. As illustrated in FIG. 3, the process 300 may include the acts of receiving ephemeris information at a first satellite transceiver, steering a beam of encoded optical data, extending a field of regard of the first satellite transceiver, transmitting the beam of encoded optical data over the extended field of regard, switching a mode of operation of the first satellite transceiver, receiving a second beam of encoded optical data at the first satellite transceiver, and focusing and collecting the second beam of encoded optical data at an optical sensor.

In act 302, the process 300 may include receiving ephemeris information at the first satellite transceiver 102a. In various examples, the ephemeris information specifies a location of the second satellite transceiver 102b. The ephemeris information may be received at the first satellite transceiver 102a from a satellite ground station (e.g., ground station 200 illustrated in FIG. 2) or another satellite transceiver. Based on the received ephemeris information, the process 300 may include generating a first beam of encoded optical data. As discussed, in some examples, the first beam of encoded optical data may have a linear polarization.

In act 304, the process 300 may include steering the first beam of encoded optical data over a field of view of the non-mechanical beamsteering device 106a. For example, act 304 may include applying a control voltage (e.g., an analog control voltage) to the non-mechanical beamsteering device 106a to adjust a refractive index of the non-mechanical beamsteering device 106a. Adjustments to the refractive index of the non-mechanical beamsteering device 106a adjust a direction of the first beam of encoded optical data as it propagates along the length of the non-mechanical beamsteering device 106a, thereby, steering the first beam of encoded optical data in a desired direction. The process 300 may include providing the first beam of encoded optical data along the transmit path 114a of the first satellite transceiver 102a to the beam splitter 110a, and directing the first beam of encoded optical data to the first coarse steering optics 112a with the first beam splitter 110a.

In acts 306 and 308, the process 300 may include transmitting, for a duration of the transmit mode of the first satellite transceiver 102a, the first beam of encoded optical data through the entrance aperture 130a in a direction of the location of the second satellite transceiver 102b, and over an extended field of regard of the non-mechanical beamsteering device 106a. As described herein, the field of regard is extended relative to the field of view of the non-mechanical beamsteering device 106a by the coarse steering optics 112a, which may include a polarized grating stack. In particular, act 306 may include applying a control voltage (e.g., an analog control voltage) to individual polarized gratings within the stack electrically to control those polarized gratings to convert the first beam of encoded optical data into either a left-handed polarization or a right-handed polarization. Act 306 may then include deflecting the first beam of encoded optical data at a particular exit angle of deflection based on the polarization (e.g., handedness) of the beam.

In act 310, the process 300 may include switching the mode of operation of the first satellite transceiver 102a from the transmit mode to the receive mode at an expiration of the duration of the transmit mode. Switching operations performed by the control circuitry 122a, and the conditions for switching between modes of operation, are further described herein with reference to at least FIG. 4. In act 312, and during the receive mode of first satellite transceiver 102a, the process 300 may include receiving a second beam of encoded optical data from the second satellite transceiver 102b through the entrance aperture 130a. Act 312 may include directing the received second beam of encoded optical data along the receive path 116a of the first satellite transceiver 102a with the beam splitter 110a. In act 314, the process 300 includes focusing the second beam of encoded optical data on the optical sensor 120a of the first satellite transceiver 102a with the optical focusing element 118a.

As discussed, in many examples, the second satellite transceiver 102b is configured to receive the first beam of encoded optical data and transmit the second beam of encoded optical data in response to receiving the first beam of encoded optical data. Accordingly, in various examples, the process 300 may further include receiving at least the first beam of encoded optical data at the second satellite transceiver 102b, focusing the first beam of encoded optical data on the optical sensor 120b of the second satellite transceiver 102a, estimating a trajectory of the first satellite transceiver 102a based at least in part on the first beam of encoded optical data, and transmitting the second beam of encoded optical data from the second satellite transceiver 102b to a projected location of the first satellite transceiver 102a based at least in part on the estimated trajectory of the first satellite transceiver 102a. In at least one example, the second beam of encoded optical data includes ephemeris data for the second satellite transceiver 102b. In such an example, the first satellite transceiver 102a may transmit a third beam of encoded optical data back to the second satellite transceiver 102b based a projected location determined from the ephemeris data.

Figure 4:
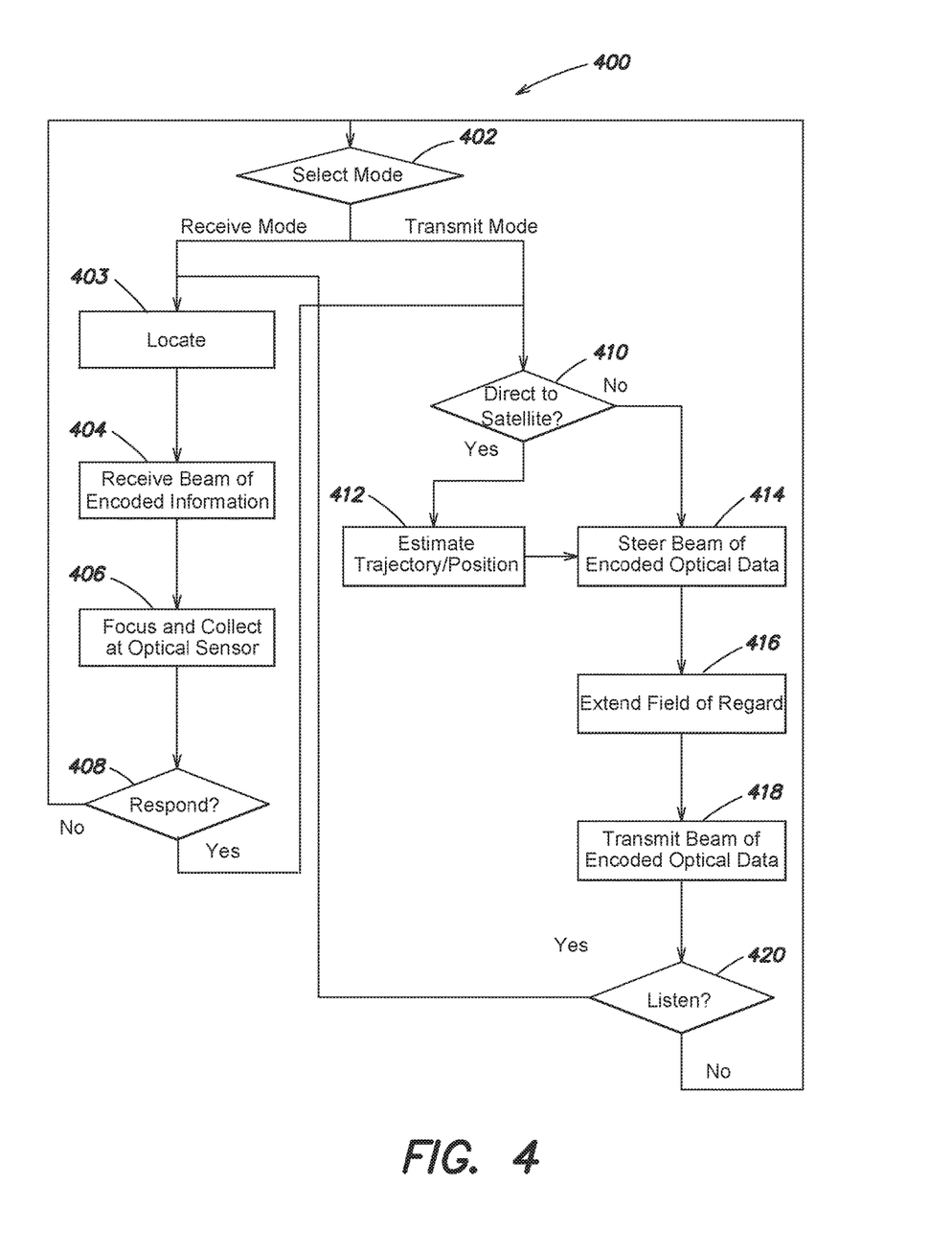
FIG. 4 is a process flow for controlling the operation of a satellite transceiver; according to various examples described herein.

Referring now to FIG. 4, illustrated is one example of a process flow for controlling the operation of a satellite transceiver, such as the first satellite transceiver 102a or the second satellite transceiver 102b illustrated in FIG. 1. Individual acts within process 400 may be performed by one or more components of the first satellite transceiver 102 or the second satellite transceiver, such as the control circuitry 122a or the control circuitry 122b. FIG. 4 is described with continuing reference to FIG. 1. While FIG. 4 is primarily described with reference to the first satellite transceiver 102a, it is appreciated that in other examples, process 400 may also apply to the second satellite transceiver 102b, or any additional satellite transceiver within the inter-satellite communication system 100.

At decision block 402, the process 400 may include selecting a mode of operation. As discussed herein, the control circuitry 122a may control components of the first satellite transceiver 102a to switch between a transmit mode of operation and a receive mode of operation. In some additional examples, the control circuitry 122a may also control components of the first satellite transceiver 102a to switch to a transceiver mode of operation in which operations of both of the transmit mode and the receive mode are executed. In some examples, the first satellite transceiver 102a may operate in the receive mode of operation as a default mode of operation until a beam of encoded optical data is received. To switch between modes of operation, the control circuitry 122a may activate or de-activate at least one of the optical source 104a, the non-mechanical beamsteering device 106a, the coarse steering optics 112a, and the optical sensor 120a. For instance, to switch to the transmit mode of operation, the control circuitry 122a may activate the optical source 104a, the non-mechanical beamsteering device 106a, and the coarse steering optics 112a. To switch the satellite transceiver 102a to the receive mode of operation, the control circuitry 122a may deactivate the optical source 104a and the non-mechanical beamsteering device 106a, and read-out the optical sensor 120a.

While in the receive mode of operation, the process 400 may include receiving a beam of encoded optical data (act 404). The received beam of encoded optical data may be received from a satellite ground station or another satellite transceiver. In various examples, to receive the beam of encoded optical data, the process 400 may further include controlling the beamsteering of the coarse steering optics 112a to locate a location of the transmitting satellite ground station or other satellite transceiver. Such an act is illustrated as act 403 in FIG. 4. It is appreciated that in many examples the coarse steering optics 112a may be adjusted prior to receiving the beam of encoded optical data. In various examples, the coarse steering optics 112a may be controlled in a manner similar to that previously discussed above with reference to at least act 306 described with reference to FIG. 3. In some examples, the process 400 may include the scanning the satellite transceiver 102a across the field of regard of +/−70 degrees from the optical boresight of the satellite transceiver 102a to locate the proper receiving angle. In some examples, ephemeris data received from the ground station, and updates to the ephemeris data, may help the satellite transceiver locate the proper receiving angle and the corresponding transmitting satellite transceiver (e.g., satellite transceiver 102b).

Similar to process 300 described above, the process 400 may then include focusing the beam of encoded optical data on the optical sensor 120a with the optical focusing element 118a (act 406). The process 400 may then include responding to the received beam of encoded optical data, or returning to the mode selection act 402 (act 408). If the control circuitry 122a selects to respond to the received beam of encoded optical data, the process 400 may include determining if the response is to be directed to another satellite transceiver (e.g., the second satellite transceiver 102b) or a satellite ground station (act 410). If the response is to be directed to another satellite transceiver, the process 400 may include estimating a trajectory of that satellite transceiver based at least in part on the received beam of encoded optical data (act 412). For instance, the received beam of encoded optical data may include ephemeris data for the intended recipient satellite transceiver, and act 412 may include executing various algorithms for calculating the position of a satellite in orbit to estimate the trajectory of the intended recipient satellite transceiver. It is appreciated that in many instances both the first satellite transceiver 102a and the intended recipient satellite transceiver may be in motion. Accordingly, act 412 may include processes that account for current positions and projected paths of travel when estimating the trajectory of the intended recipient satellite receiver. The process 400 then proceeds to act 414. If the response to be directed to a satellite ground station, such as the ground station 200 illustrated in FIG. 2, the process 400 proceeds directly from act 410 to act 414.

In act 414, the process 400 may include steering a beam of encoded optical data over a field of view of the non-mechanical beamsteering device 106a. Similar to act 304 in FIG. 3, the process 400 may include applying a control voltage (e.g., an analog control voltage) to the non-mechanical beamsteering device 106a to adjust a refractive index of the non-mechanical beamsteering device 106a. Adjustments to the refractive index of the non-mechanical beamsteering device 106a adjust the direction of the beam of encoded optical data. In acts 416 and 418 the process 400 may include transmitting, for a duration of the transmit mode of the first satellite transceiver 102a, the beam of encoded optical data through the entrance aperture 130a in a direction of the intended recipient. Acts 416 and 418 may include operations and processes similar to those discussed above with reference to acts 306 and 308 in FIG. 3, respectively.

In act 420, the process 400 may include determining if a response to the transmitted beam of encoded optical data is expected (act 420). If a response is expected, the process 400 may include switching to the receive mode to listen for a response. If no response is expected, the process 400 may include returning to the act of selecting a mode of operation 402. While not explicitly illustrated and described with reference to FIG. 4, in various examples, the process 400 may include other acts and processes. Such acts and processes are further described herein with reference to the inter-satellite communication system 100 of FIG. 1, or the process of communicating between two or more satellite transceivers and/or a satellite ground station illustrated in FIG. 3.

Various aspects and examples described herein provide inter-satellite communication systems, and methods for communicating between satellites and/or a ground station.

In at least one example, the inter-satellite communication system includes one or more satellite transceivers each having one or more non-mechanical optical steering components collectively configured to provide a wide field of regard (FOR). In particular, at least one satellite transceiver of the inter-satellite communication system includes a non-mechanical beamsteering device to steer a beam of encoded optical data over a field of view thereof, and coarse steering optics configured to extend a field of regard of the non-mechanical beamsteering device. Moreover, the described satellite transceiver may transmit the beam of encoded optical data through an entrance aperture, and receive a response to the beam of encoded optical data (e.g., from a ground station or another satellite transceiver) via the same entrance aperture.

Having described above several aspects of at least one example, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of communicating between satellites, the method comprising:
   receiving ephemeris information at a first satellite transceiver, the ephemeris information specifying a first location of a second satellite transceiver;
   providing a first beam of encoded optical data along a transmit path of the first satellite transceiver to a first beam splitter;
   directing the first beam of encoded optical data to first coarse steering optics with the first beam splitter;
   steering the first beam of encoded optical data over a field of view of a first non-mechanical beamsteering device of the first satellite transceiver;
   transmitting, for a duration of a transmit mode of the first satellite transceiver, the first beam of encoded optical data through a first entrance aperture in a direction of the first location of the second satellite transceiver and over an extended field of regard of the first non-mechanical beamsteering device, the field of regard being extended relative to the field of view of the first non-mechanical beamsteering device by the first coarse steering optics;
   switching a mode of operation of the first satellite transceiver from the transmit mode to a receive mode at an expiration of the duration of the transmit mode;
   receiving a second beam of encoded optical data from the second satellite transceiver through the first entrance aperture during the receive mode, and directing the received second beam of encoded optical data along a receive path of the first satellite transceiver with the first beam splitter, wherein the receive path is distinct from the transmit path; and
   focusing the second beam of encoded optical data on a first optical sensor of the first satellite transceiver with an optical focusing element positioned along the receive path.

2. The method of claim 1, further comprising:
   receiving at least the first beam of encoded optical data at the second satellite transceiver;
   focusing the first beam of encoded optical data on a second optical sensor of the second satellite transceiver; and
   estimating a trajectory of the first satellite transceiver based at least in part on the first beam of encoded optical data.

3. The method of claim 2, further comprising transmitting the second beam of encoded optical data from the second satellite transceiver to a projected location of the first satellite transceiver based at least in part on the estimated trajectory of the first satellite transceiver.

4. The method of claim 3, wherein transmitting the second beam of encoded optical data from the second satellite transceiver includes:
   steering the second beam of encoded optical data over a field of view of a second non-mechanical beamsteering device; and
   transmitting the second beam of encoded optical data to the projected location of the first satellite transceiver over an extended field of regard of the second non-mechanical beamsteering device, the field of regard being extended relative to the field of view of the second non-mechanical beamsteering device by second coarse steering optics.

5. The method of claim 1, further comprising:
   generating the first beam of encoded optical data, wherein the first beam of encoded optical data has a linear polarization; and
   converting linear polarization to at least one of a left-handed circular-polarization and a right-handed circular polarization prior to transmitting the first beam of encoded optical data.

6. The method of claim 5, wherein transmitting the first beam of encoded optical data over the extended field of regard of the first non-mechanical beamsteering device includes deflecting the first beam of encoded optical data at an angle based on a handedness of the circular-polarization.

7. The method of claim 1, further comprising locating a second location of the second satellite transceiver prior to receiving the second beam of encoded optical data from the second satellite transceiver, the second location of the second satellite transceiver being different from the first location of the second satellite transceiver.

8. The method of claim 1, wherein receiving the ephemeris information at the first satellite transceiver includes receiving the ephemeris information from a satellite ground station.

9. The method of claim 8, further comprising locating the satellite ground station prior to receiving the ephemeris information from the satellite ground station.

10. The method of claim 1, further comprising:
    estimating a trajectory of the second satellite transceiver based at least in part on the second beam of encoded optical data; and
    transmitting a third beam of encoded optical data from the first satellite transceiver to a projected location of the second satellite transceiver based at least in part on the estimated trajectory of the second satellite transceiver.

11. An inter-satellite communication system comprising:
    a first satellite transceiver having a first entrance aperture and including:
       a first non-mechanical beamsteering device configured to steer a first beam of encoded optical data over a field of view thereof;
       first coarse steering optics configured to extend a field of regard of the first non-mechanical beamsteering device relative to the field of view of the first non-mechanical beamsteering device, wherein during a transmit mode of operation of the first satellite transceiver the first coarse steering optics are positioned to transmit the first beam of encoded optical data through the first entrance aperture in a direction of a location of a second satellite transceiver, and wherein the location of the second satellite transceiver is based on ephemeris information received at the first satellite transceiver;

a first beam splitter positioned, during the transmit mode of operation of the first satellite transceiver, to receive the first beam of encoded optical data along a transmit path of the first satellite transceiver and to direct the first beam of encoded optical data to the first coarse steering optics, and during a receive mode of operation of the first satellite transceiver, to receive a second beam of encoded optical data from the second satellite transceiver through the first entrance aperture and direct the second beam of encoded optical data along a receive path, the receive path being distinct from the transmit path;

first control circuitry configured to switch operation of the first satellite transceiver from the transmit mode to the receive mode at an expiration of a duration of the transmit mode;

a first optical sensor positioned along the receive path to collect the second beam of encoded optical data; and an optical focusing element positioned in the receive path and configured to focus the second beam of encoded optical data onto the first optical sensor.

12. The inter-satellite communication system of claim 11, further comprising an optical source configured to generate the first beam of encoded optical data, wherein the first beam of encoded optical data has a linear polarization.

13. The inter-satellite communication system of claim 12, wherein the first control circuitry is operatively coupled to at least the optical source, the first non-mechanical beamsteering device, and the first coarse steering optics, the first control circuitry being configured to control the optical source, the first non-mechanical beamsteering device, and the first coarse steering optics to switch between the transmit mode and the receive mode of the first satellite transceiver.

14. The inter-satellite communication system of claim 13, further comprising a quarter wave-plate interposed between the first non-mechanical beamsteering device and the first beam splitter, the quarter wave-plate configured to convert the linear-polarization to a circular-polarization.

15. The inter-satellite communication system of claim 14, wherein the first coarse steering optics are configured to deflect the first beam of encoded optical data at an angle based on a handedness of the circular-polarization.

16. The inter-satellite communication system of claim 11, further comprising:

the second satellite transceiver including:

a second beam splitter configured to receive the first beam of encoded optical data through a second entrance aperture of the second satellite transceiver, and direct the first beam of encoded optical data along a receive path of the second satellite transceiver;

a second optical sensor positioned along the receive path to collect the first beam of encoded optical data;

a second optical focusing element positioned in the receive path to focus the first beam of encoded optical data onto the second optical sensor; and second control circuitry operatively coupled to at least the second optical sensor and configured to estimate a trajectory of the first satellite transceiver based at least in part on the first beam of encoded optical data.

17. The inter-satellite communication system of claim 16, wherein the second satellite transceiver further includes:

a second non-mechanical beamsteering device configured to steer the second beam of encoded optical data over a field of view thereof; and second coarse steering optics configured to extend a field of regard of the second non-mechanical beamsteering device relative to the field of view of the second non-mechanical beamsteering device, and transmit the second beam of encoded optical data through the second entrance aperture to a projected location of the first satellite transceiver based at least in part on the estimated trajectory of the first satellite transceiver.

18. The inter-satellite communication system of claim 11, wherein the first control circuitry is operatively coupled to at least the first optical sensor and is further configured to estimate a trajectory of the second satellite transceiver based at least in part on the second beam of encoded optical data.

19. The inter-satellite communication system of claim 18, wherein first coarse steering optics are configured to transmit a third beam of encoded optical data through the first entrance aperture to a projected location of the second satellite transceiver based at least in part on the estimated trajectory of the second satellite transceiver.

* * * * *

UNITED STATES PATENT AND TRADEMARK OFFICE
CERTIFICATE OF CORRECTION

PATENT NO. : 10,243,654 B1
APPLICATION NO. : 15/941821
DATED : March 26, 2019
INVENTOR(S) : Gerald P. Uyeno et al.

Page 1 of 1

It is certified that error appears in the above-identified patent and that said Letters Patent is hereby corrected as shown below:

In the Claims

Column 20, Line 29, delete "converting linear polarization" and insert -- converting the linear polarization --.

Signed and Sealed this
Twenty-first Day of May, 2019

Andrei Iancu
*Director of the United States Patent and Trademark Office*